US012340288B2

(12) United States Patent
He et al.

(10) Patent No.: US 12,340,288 B2
(45) Date of Patent: Jun. 24, 2025

(54) METHOD OF TRAINING CLASSIFICATION MODEL, METHOD OF CLASSIFYING SAMPLE, AND DEVICE

(71) Applicant: Beijing Baidu Netcom Science Technology Co., Ltd., Beijing (CN)

(72) Inventors: Huihui He, Beijing (CN); Leyi Wang, Beijing (CN); Minghao Liu, Beijing (CN); Jiangliang Guo, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 861 days.

(21) Appl. No.: 17/619,533

(22) PCT Filed: May 17, 2021

(86) PCT No.: PCT/CN2021/094064
§ 371 (c)(1),
(2) Date: Dec. 15, 2021

(87) PCT Pub. No.: WO2022/100045
PCT Pub. Date: May 19, 2022

(65) Prior Publication Data
US 2022/0383190 A1 Dec. 1, 2022

(30) Foreign Application Priority Data
Nov. 13, 2020 (CN) .......................... 202011274936.5

(51) Int. Cl.
*G06F 40/30* (2020.01)
*G06N 20/00* (2019.01)

(52) U.S. Cl.
CPC ............. *G06N 20/00* (2019.01); *G06F 40/30* (2020.01)

(58) Field of Classification Search
None
See application file for complete search history.

(56) References Cited

U.S. PATENT DOCUMENTS

| 2013/0254153 A1* | 9/2013 | Marcheret | G06N 7/00 706/59 |
| 2020/0285898 A1* | 9/2020 | Dong | G06N 3/08 |
| 2022/0121883 A1* | 4/2022 | Lee | G06N 20/00 |

FOREIGN PATENT DOCUMENTS

| CN | 108664893 A | 10/2018 |
| CN | 110472681 A | 11/2019 |

(Continued)

OTHER PUBLICATIONS

Wang et al., "Neural Networks Are More Productive Teachers Than Human Raters: Active Mixup for Data-Efficient Knowledge Distillation from a Blackbox Model", Mar. 31, 2020, arXiv (Year: 2020).*

(Continued)

*Primary Examiner* — Nafiz E Hoque
(74) *Attorney, Agent, or Firm* — Keating & Bennett, LLP

(57) ABSTRACT

The present disclosure provides a method of training a classification model, which relates to an active learning, neural network and natural language processing technology. A specific implementation scheme includes: selecting, from an original sample set, a plurality of original samples with a class prediction result meeting a preset condition as to-be-labeled samples according to a class prediction result for a plurality of original samples in the original sample set; labeling the to-be-labeled sample as belonging to a class by using the second classification model, so as to obtain a first labeled sample set; and training the first classification model by using the first labeled sample set. The present disclosure further provides a method of classifying a sample, an electronic device, and a storage medium.

18 Claims, 7 Drawing Sheets

(56) References Cited

FOREIGN PATENT DOCUMENTS

| | | |
|---|---|---|
| CN | 111554268 A | 8/2020 |
| CN | 111754985 A | 10/2020 |
| CN | 111858943 A | 10/2020 |
| CN | 112270379 A | 1/2021 |
| EP | 3 736 749 A1 | 11/2020 |

OTHER PUBLICATIONS

Official Communication issued in corresponding European Patent Application No. 21819712.7 mailed on Oct. 18, 2022.
Wang et al., "Neural Networks Are More Productive Teachers Than Human Raters: Active Mixup for Data-Efficient Knowledge Distillation from a Blackbox Model", Cornell University Library, Mar. 31, 2020, 10 pages.
Zhang et al., "Semi-supervised active learning image classification method based on Tri-Training algorithm", IEEE International Conference on Artificial Intelligence and Information Systems (ICAIIS), Mar. 20, 2020, pp. 206-210.
Tomanek et al., "Semi-Supervised Active Learning for Sequence Labeling", Proceedings of the Joint Conference of the 47th Annual Meeting of the ACL and the 4th International Joint Conference on Natural Language Processing of the AFNLP, vol. 2, Aug. 2-7, 2009, pp. 1039-1047.
Official Communication issued in International Patent Application No. PCT/CN2021/094064, mailed on Aug. 5, 2021.

\* cited by examiner

METHOD OF TRAINING CLASSIFICATION MODEL, METHOD OF CLASSIFYING SAMPLE, AND DEVICE

CROSS-REFERENCE TO RELATED APPLICATIONS

This application is a National Stage Application of International Application No. PCT/CN2021/094064, filed on May 17, 2021, entitled "METHOD OF TRAINING CLASSIFICATION MODEL, METHOD OF CLASSIFYING SAMPLE, APPARATUS, AND DEVICE", which claims priority to the Chinese Patent Application No. 202011274936.5, filed on Nov. 13, 2020, the content of which are incorporated herein by reference in its entirety.

TECHNICAL FIELD

The present disclosure relates to a field of a machine learning technology, in particular to active learning, neural network and natural language processing technologies. More specifically, the present disclosure provides a method of training a classification model, a method of classifying a sample, an electronic device, and a storage medium.

BACKGROUND

With a continuous development of computer and Internet technology, machine learning are widely used in various applications. For example, the machine learning may be used in a scenario of classifying a sample, which has characteristics of high robustness and sustainable optimization compared with a traditional rule-based method or manual classification method.

However, a machine learning model requires a large amount of labeled data, which is a problem often encountered in a practical application scenario of the machine learning model. The model requires a large number of labeled samples, but a labeling cost is high.

SUMMARY

There is provided a method of training a classification model, a method of classifying a sample, an electronic device, and a storage medium.

According to a first aspect, there is provided a method of training a classification model, the classification model including a first classification model and a second classification model, the method including: selecting, from an original sample set, a plurality of original samples having a class prediction result meeting a preset condition as to-be-labeled samples, according to class prediction results for a plurality of original samples in the original sample set; labeling the to-be-labeled sample as belonging to a class by using the second classification model, so as to obtain a first labeled sample set; and training the first classification model by using the first labeled sample set.

According to a second aspect, there is provided a method of classifying a sample, including: acquiring a to-be-classified sample; and classifying the to-be-classified sample by using a classification model, so as to obtain a classification result for the to-be-classified sample, wherein the classification model is trained by using the method of training the classification method.

According to a third aspect, there is provided an electronic device, including: at least one processor; and a memory communicatively connected to the at least one processor, wherein the memory stores instructions executable by the at least one processor, and the instructions, when executed by the at least one processor, cause the at least one processor to implement the method as described above.

According to a fourth aspect, there is provided a non-transitory computer-readable storage medium having computer instructions stored thereon, wherein the computer instructions are configured to cause a computer to implement the method as described above.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to understand the solution better and do not constitute a limitation to the present disclosure.

DETAILED DESCRIPTION OF EMBODIMENTS

Figure 1:
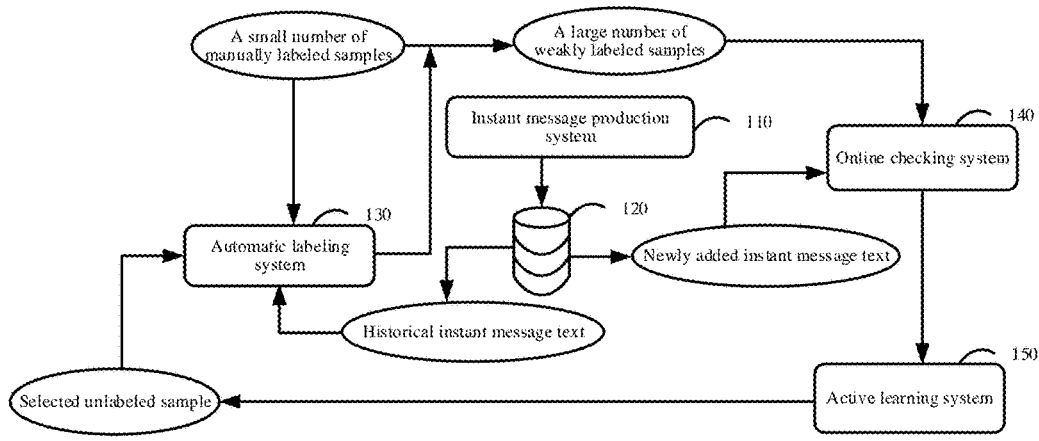
FIG. 1 shows an exemplary system architecture in which a method and an apparatus of training a classification model and a method and an apparatus of classifying a sample may be applied according to an embodiment of the present disclosure.

Exemplary embodiments of the present disclosure are described below with reference to the accompanying drawings, which include various details of the embodiments of the present disclosure to facilitate understanding, and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

An instant message checking is very important to improve a health rate of an instant message channel and reduce a risk of the instant message channel being closed due to irregular use. At present, generally checking of an instant message includes a keyword matching in combination with a lot of manually checking. Specifically, matching and filtering may be performed on an instant message based on a keyword library and a regular expression, and a sampling checking may be performed by way of manual checking. The above method relies heavily on the keyword library, and requires a high labor cost. In addition, checking based on keywords in combination with manual checking requires the keyword library to be manually summarized and supplemented with a continuous development of business, which has a large workload. Moreover, the keyword matching method only makes use of a superficial feature of vocabulary and does not fully mine a sense relationship and a semantic relationship, which has a great limitation.

In the method of checking an instant message based on machine learning, an instant message checking is taken as a binary classification task of a text, and a text checking is performed based on a machine learning algorithm. Such method has characteristics of high robustness and sustainable optimization as compared with a traditional rule-based method or manual classification method. However, a machine learning model requires a large amount of labeled data, which is a problem often encountered in a practical application scenario of the machine learning model. The model requires a large number of labeled samples, but a labeling cost is high. Sometimes, a newly added labeled sample may not significantly help to improve a performance of the model. Therefore, the method in which the instant message checking is regarded as the binary classification task requires a large amount of manually labeled data. With the continuous development of business, the latest labeled data needs to be constantly supplemented to iteratively optimize the model with business. However, an instant messaging service may generate a large number of instant message logs every day, and a to-be-labeled sample randomly selected therefrom may not certainly improve the model after consuming the labeling cost.

In a process of implementing the present disclosure, the inventor found that it is possible to allow a model to actively select a sample valuable for a current training iteration based on an active learning technology, in order to be labeled by experts, so that the sample valuable for the current training iteration may be found. However, such a method still has the following shortcomings: (1) the newly selected to-be-labeled sample needs to be labeled by experts, which means that an additional labor cost needs to be introduced; (2) in order to improve an efficiency of manual labeling, an automatic iterative model for an online labeling platform needs to be developed, which increases a workload of developing the online labeling platform; (3) due to a limitation of manual labeling efficiency, the number of labeled samples added every day is limited, and the performance of model iterative optimization is limited.

In view of this, the present disclosure provides a method of training a classification model including a first classification model and a second classification model. The method includes: selecting from a sample set a plurality of samples having a class prediction result meeting a preset condition as to-be-labeled samples according to a class prediction result for each sample of a plurality of samples in the sample set, which is generated in a process of classifying the plurality of samples in the sample set using the first classification model; labeling the to-be-labeled sample as belonging to a class by using the second classification model, so as to obtain a first labeled sample set; and training the first classification model by using the first labeled sample set.

FIG. 1 shows an exemplary system architecture 100 in which a method and an apparatus of training a classification model and a method and an apparatus of classifying a sample may be applied according to an embodiment of the present disclosure. It should be noted that FIG. 1 is only an example of a system architecture in which the embodiments of the present disclosure may be applied, so as to help those skilled in the art to understand the technical content of the present disclosure. It does not mean that the embodiments of the present disclosure may not be applied to other apparatuses, systems, environments or scenes.

As shown in FIG. 1, the system architecture 100 according to the embodiment may include an instant message production system 110, a database 120, an automatic labeling system 130, an online checking system 140 and an active learning system 150.

The instant message production system 110 may store the instant message generated every day in the database 120. The automatic labeling system 130 and the online checking system 140 may acquire an instant message text from the database 120 for processing. The automatic labeling system 130 may include an instant message checking model that may automatically label the instant message text as belonging to a class. The instant message checking model may include a trained language sub-model and a classification sub-model. The language sub-model is sensitive to instant message terms and specific to the field of instant message. The classification sub-model is used for classifying the instant message text and automatically labeling the instant message text as belonging to a class. The instant message text may be classified into a class of instant message text being approved or a class of instant message text being unapproved.

The instant message production system 110 may generate a large number of instant message logs every day, and the automatic labeling system 130 is required to constantly supplement the latest labeled data to the model in so that the model may be iteratively optimized with business. Exemplarily, the model in the automatic labeling system 130 may be set to iterate once a month, then the automatic labeling system 130 may select an unlabeled historical instant message sample of a previous month from the database 120, input to the language sub-model, and train the language sub-model based on the data increment, so as to obtain the language sub-model specific to the field of instant message. Before inputting the samples into the language sub-model, a reduction may be performed on the samples, and some of samples with a high similarity may be deleted, thereby reducing a sample redundancy and speeding up a model iteration. After the language sub-model specific to the field of instant message is obtained, the language sub-module together with the classification sub-model may be trained using a small number of manually labeled samples, so as to obtain an instant message checking model which is based on a language model. As a model specific to the field of instant message, the language sub-model may identify semantics of the instant message text. The classification sub-model may classify the instant message based on the semantics of the instant message, and output a result indicating that the instant message is classified into a class of instant message passing the checking or a class of instant message failing to pass the checking, so as to achieve the instant message checking. During the iteration of the language sub-model and the classification sub-model, adjustment of the model may be performed based on a sum of loss functions of the two sub-models. The finally trained model may have an excellent performance in a task of checking an instant message, so that the automatic labeling system 130 may output an instant message text with a class label. Such instant message text may be referred to as a weakly labeled text here. The automatic labeling system 130 may achieve a high accuracy in the class labeling for the instant message text, and may replace the manual labeling to generate a large number of weakly labeled data, so as to reduce the labeling cost.

According to the embodiments of the present disclosure, the instant message checking model based on language model may be directly put online to checking the instant message, and a prediction accuracy may be improved. However, the online model is too complex, the prediction time is too long, and the online prediction performance may not be met. A direct solution is to perform a model distillation. The model distillation refers to that a complex model (also known as a teacher model) may train a simple model (also known as a student model) so that the student model may learn a prediction ability of the teacher model.

According to the embodiments of the present disclosure, the instant message checking model based on language model may act as the teacher model, and a convolutional neural network TextCNN may be chosen as the online student model. TextCNN is chosen here because TextCNN has characteristics of weight sharing and has less parameters. As an online model, TextCNN may meet a requirement for the prediction time. The teacher model may interact with the student model based on a data pool, so that the student model may learn the prediction result from the teacher model. The student model is located in the online checking system 140. The model distillation may be divided into two stages. In a first stage, a large number of unlabeled historical instant message logs are input into the teacher model, the prediction result is output, and the prediction result is determined as the weakly labeled data. In a second stage, the weakly labeled data together with the manually labeled data are input into the student model in the online checking system 140, and an incremental training is performed on the student model.

According to the embodiments of the present disclosure, an introduction of the weakly labeled data obtained based on the teacher model may increase a training corpus data amount of the online model and enhance a generalization ability of the online student model. Moreover, the online student model has a classification performance very close to that of the teacher model, and the online model has a simple structure, so that the model may meet the requirement of business for the prediction time.

According to the embodiments of the present disclosure, in order to enable the model iteration to improve the model performance, a sample with a large amount of information may be selected as the sample for training the student model. The active learning system 150 may actively select an unlabeled sample with a large amount of information to be labeled by experts or the automatic labeling system 130 by using an active learning algorithm, based on a probability of a sample belonging to each class generated in a process of classifying the sample using the student model, so as to achieve a high accuracy of classification with a small training set. Exemplarily, the active learning algorithm may include a maximum entropy strategy, a minimum confidence strategy, a minimum interval strategy, a classifier voting strategy, and the like.

According to the embodiments of the present disclosure, the sample selected by the active learning system 150 through the active learning algorithm may be input into the automatic labeling system 130 for automatic labeling, so as to generate the weakly labeled data. The weakly labeled data together with the manually labeled data may be input into the online checking system 140 to train the student model, so as to obtain the trained instant message checking model. When performing the instant message checking online, the online checking system 140 may check a new instance message text by using the trained instant message checking model, so as to quickly determine whether the instant message pass the checking or not.

It is also desired to constantly supplement latest labeled data for the instant message checking model in the online checking system 140, so that the model may be iteratively optimized with business. Exemplarily, the instant message checking model in the online checking system 140 may be set to iterate once a day, then the online checking system 140 may select the unlabeled instant message sample of a previous day from the database 120 and transmit to the online instant message checking model for the class labeling. In this process, a prediction probability for each instant message may be generated, and an instant message sample difficult to be predicted may be selected based on the prediction probability by using the active learning algorithm to further reduce the samples, such that the final to-be-labeled data selected through active learning may be formed. The to-be-labeled data selected through active learning may be transmitted to the instant message checking model based on language model in the automatic labeling system 130, and a prediction result from the model may be used as a weakly labeled result for the unlabeled data. Then, a large amount of new weakly labeled data obtained may be combined with a small amount of existing manually labeled data to form a training corpus of the current day, and an incremental training may be performed on the online instant message checking model.

Figure 2:
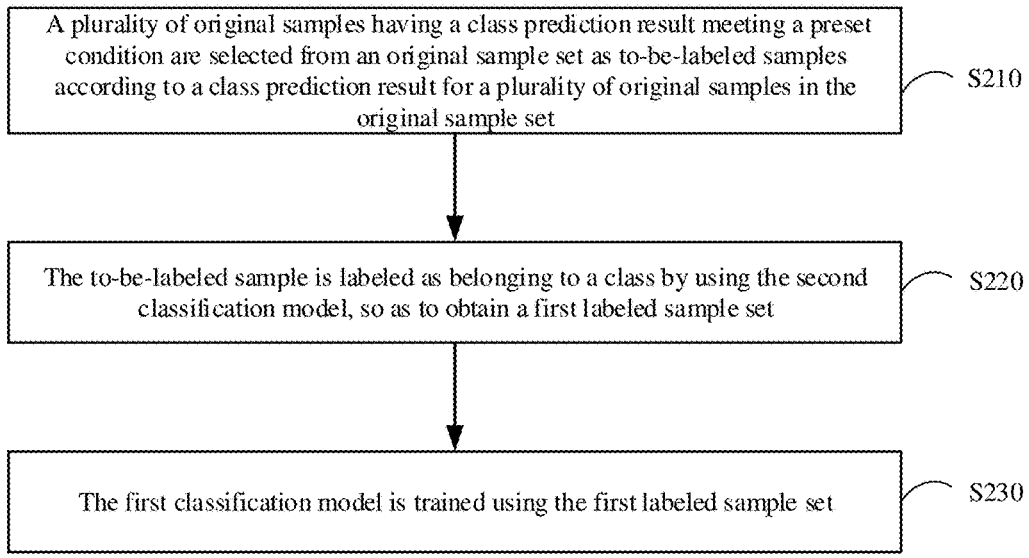
FIG. 2 shows a flowchart of a method of training a classification model according to an embodiment of the present disclosure.

FIG. 2 shows a flowchart of a method of training a classification model according to an embodiment of the present disclosure.

As shown in FIG. 2, a method 200 of training a classification model may include operation S210 to operation S230.

According to the embodiments of the present disclosure, the classification model may be a model for performing a class prediction on a sample such as a text and an image and classifying the sample. Taking the field of instant message checking as an example, the classification model may be a model for performing a class prediction on the instant message text and classifying the instant message text. The classification model may include a first classification model and a second classification model. The first classification model may be obtained by performing a model distillation on the second classification model. The model distillation refers to transferring a knowledge learned by a complex model with a strong learning ability to a simple model with a weak learning ability, so as to allow the simple model to obtain the ability of the complex model. The complex model may be called a teacher model, and the simple model may be called a student model.

According to the embodiments of the present disclosure, the second classification model may a combination of a plurality of neural networks, being a complex model that performs a classification training on a data set after being trained in different training tasks, and finally obtains a classification result. The second classification model exhibits an excellent performance and high prediction accuracy, but has a complex structure and needs a long prediction time. If the second classification model is used as an online instant message checking model, it is difficult to meet the requirement for the checking time. Therefore, in the present disclosure, the first classification model is chosen as the online instant message checking model. For example, the first classification model may be a TextCNN model, which has less parameters and fast iteration speed. If the first classification model is used for checking the instant message online in practical application, the requirement for the checking time may be met. The second classification model may be used as the teacher model, and the first classification model may be used as the student model. The first classification model may be trained using the second classification model, so that the first classification model may learn the prediction ability of the second classification model.

In operation S210, a plurality of original samples having a class prediction result meeting a preset condition are selected from an original sample set as to-be-labeled samples according to a class prediction result for a plurality of original samples in the original sample set. The class prediction result for the plurality of original samples is generated in a process of classifying the plurality of original samples in the original sample set by using the first classification model.

According to the embodiments of the present disclosure, in the instant message checking scenario, samples may be obtained by daily sampling the log of the instant message production system. It should be noted that the sample of instant message in the embodiments of the present disclosure is obtained from public dataset. The sample of instant message in the embodiments of the present disclosure is not a sample of instant message of specific user and do not reflect personal information of the specific user. For the training of the first classification model, in order to find a sample valuable for the current training iteration, a to-be-labeled sample with a large amount of information may be selected in order to be labeled by experts or by the second classification model with a high prediction accuracy, so as to achieve a high classification accuracy with a small training set.

According to the embodiments of the present disclosure, in the process of classifying the sample by using the first classification model, a class prediction result for each sample may be generated. The class prediction result may be a prediction probability of the sample belonging to each class. Exemplarily, the first classification model may perform a binary classification on the sample, so as to generate a probability of the sample belonging to class A and a probability of the sample belonging to class B. It may be understood that the greater the amount of information the sample has, the higher the uncertainty of the sample is, and the more difficult the class prediction is. Therefore, a sample for which it is difficult to predict the class may be selected as the sample with large amount of information. The sample for which it is difficult to predict the class may be such as sample that the probability of the sample belonging to the class A is 0.5 and the probability of the sample belonging to the class B is 0.5. The sample for which it is difficult to predict the class may be provided as a to-be-labeled sample to experts or the second classification model having high performance to perform the class labeling.

In operation S220, the to-be-labeled sample is labeled as belonging to a class by using the second classification model, so as to obtain a first labeled sample set.

According to the embodiments of the present disclosure, because the second classification model has an excellent performance and a high ability of prediction, the second classification model may be used to perform the class prediction and classification on the selected to-be-labeled data for which it is difficult to predict the class, so as to obtain the classification result with high accuracy.

In an example, if it is predicted that a probability of an sample belonging to class A is 0.5 and a probability of the sample belonging to class B is 0.5 by using the first classification model, and it is predicted that a probability of the sample belonging to class A is 0.8 and a probability of the sample belonging to class B is 0.2 by using the second classification model predicts, then it may be determined that the sample belongs to class A, and the sample may be labeled as belonging to class A, so as to obtain a sample with a class label. The second classification model may be used to perform the class prediction and class labeling on each sample difficult to be predicted, so as to obtain a first labeled sample set including samples with class labels.

In operation S230, the first classification model is trained using the first labeled sample set.

According to the embodiments of the present application, a sample X in the first labeled sample set may be input to the first classification model, and the first classification model may output a class prediction result for the sample X. A loss function of the first classification model may be determined according to a difference between the class prediction result for the sample X output by the first classification model and the class label of the sample X labeled by the second classification model, and a model parameter of the first classification model may be adjusted according to the loss function, so as to obtain an updated first classification model. The above training process may be repeatedly performed using the updated first classification model until the loss function converges, so as to obtain a trained first classification model. It may be understood that the first classification model may be trained using the first labeled sample set obtained by the second classification model, so that the first classification model may learn the prediction ability of the second classification model, and the classification performance of the first classification model may continuously approaching the second classification model, so as to improve the accuracy of the classification result from the first classification model.

According to the embodiments of the present disclosure, in the daily iteration process, the introduction of the first labeled sample set obtained based on the second classification model may increase the training corpus data amount of the first classification model and enhance the generalization ability of the first classification model. In addition, the classification performance of the first classification model is largely close to that of the second classification model, and the first classification model has a simple structure and may meet the requirement of business for the prediction time.

According to the embodiments of the present application, a manually labeled sample set may be used together with the first labeled sample set to train the first classification model, so as to perform an incremental training on the first classification model. Exemplarily, in the daily iteration process, instant message corpus which are a manually labeled for checking may be repeatedly added, enhancing a stability of the online model in the iteration process. In the daily incremental iteration process of the online instant message checking model, only the latest corpus labeled by the second classification model is introduced. As the passage of time, a proportion of the data labeled by the second classification model may continuously rise, the uncertainty of the corpus for model training gradually increases, and the uncertainty of the prediction performance of the model may continuously increase. Therefore, training the first classification model using the manually labeled sample set and the first labeled sample set may enhance the stability of the online model in the iteration process.

According to the embodiments of the present disclosure, a plurality of samples having a class prediction result meeting a preset condition may be selected from the sample set as a to-be-labeled sample according to a class prediction result for each sample of a plurality of samples in the sample set. The class prediction result for each sample of a plurality of samples in the sample set is generated in the process of classifying the plurality of samples in the sample set using the first classification model. The to-be-labeled sample may be labeled as belonging to the class by using the second classification model, so as to obtain the first labeled sample set. The first classification model may be trained using the first labeled sample set. Because the first classification model is trained using the labeled sample obtained by the second classification model, the manually labeled data may be reduced, and the labeling cost may be reduced. Further, because the first classification model is trained using the sample set obtained by the second classification model, the prediction ability of the first classification model may be close to that of the second classification model, and the classification accuracy of the first classification model may be improved. Furthermore, because in the iteration process of the first classification model, the sample with a large amount of information is actively selected to be labeled by the second classification model, a high classification accuracy may be achieved in a case of a small training set.

Figure 3:
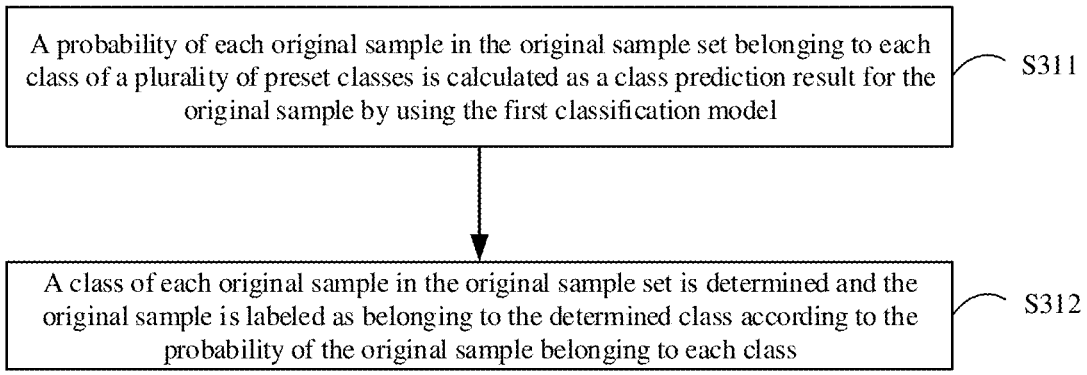
FIG. 3 shows a flowchart of a method of classifying a plurality of samples in a sample set by using a first classification model according to an embodiment of the present disclosure.

FIG. 3 shows a flowchart of a method of classifying a plurality of samples in a sample set by using the first classification model according to an embodiment of the present disclosure.

As shown in FIG. 3, the method may include operation S311 to operation S312.

In operation S311, a probability of each original sample in the original sample set belonging to each class of a plurality of preset classes is calculated as a class prediction result for the original sample by using the first classification model.

In operation S312, a class of each original sample in the original sample set is determined and the original sample is labeled as belonging to the determined class according to the probability of the original sample belonging to each class.

According to the embodiments of the present disclosure, in the process of classifying the sample by using the first classification model, a prediction probability of each sample belonging to each class may be generated. Exemplarily, for a preset class A and a preset class B, the first classification model may perform a class prediction on the sample, and generate a probability of the sample belonging to class A and/or a probability of the sample belonging to class B. Then, the class of the sample may be determined as A or B based on the probability of the sample belonging to class A and/or the probability of the sample belonging to class B. For example, the first classification model may perform the class prediction on a sample Y, and generate a probability 0.9 of the sample Y belonging to the class A and a probability 0.1 of the sample belonging to the class B, then the class of the sample Y may be determined as A, and the sample Y may be labeled with a class label A. In the field of the instant message checking, class A may be passing the checking and class B may be failing to pass the checking. If the sample Y is labeled with the class label A by the first classification model, the sample Y is approved.

Figure 4:
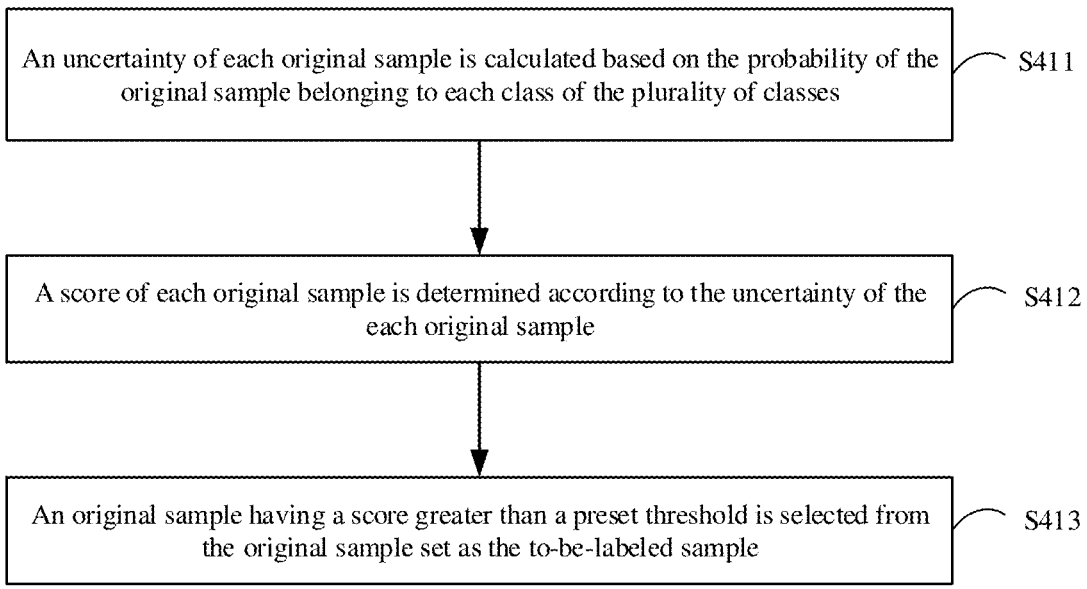
FIG. 4 shows a flowchart of a method of selecting a plurality of samples with a class prediction result meeting a preset condition from an original sample set as a to-be-labeled sample according to an embodiment of the present disclosure.

FIG. 4 shows a flowchart of a method of selecting a plurality of samples with a class prediction result meeting a preset condition from the original sample set as a to-be-labeled sample according to an embodiment of the present disclosure.

As shown in FIG. 4, the method may include operation S411 to operation S413.

In operation S411, an uncertainty of each original sample is calculated based on the probability of the original sample belonging to each class of the plurality of classes.

According to the embodiments of the present disclosure, in order to select a valuable sample, an active learning strategy may be used to actively select an unlabeled sample with a large amount of information to be labeled by the second classification model. The larger the amount of information the sample has, the higher the uncertainty of the classification model is. Therefore, the valuable sample may be selected by calculating the uncertainty of the sample. The uncertainty of the sample may be calculated using a maximum information entropy strategy, a minimum confidence strategy, a minimum interval strategy, a classifier voting strategy, and other active learning strategies. Specifically, in the process of classifying the sample by using the first classification model, a class prediction result for each sample may be generated, which may be a prediction probability of the sample belonging to each class. At least one of a maximum information entropy of each original sample, a minimum confidence of the original sample, a minimum interval between probabilities of the original sample belonging to different classes, or a classifier voting result for the original sample may be calculated based on the prediction probability of the original sample belonging to each class, so as to measure the uncertainty of the sample.

It may be understood that the greater the information entropy of the sample is, the greater the amount of information is, and the higher the uncertainty is. The confidence of the sample refers to a degree of confidence of the sample belonging to a class. For example, if the probabilities of the sample belonging to class A and class B respectively are (0.55, 0.45), the probability of the sample belonging to class A is relatively large, but the degree of confidence of the sample belonging to class A is just 0.55. Therefore, the minimum confidence focuses on the sample having the highest probability of belonging to a class and having a low confidence, and such a sample is difficult to be distinguished. The smaller the interval between the probabilities of the sample belonging to different classes is, the easier the sample is classified into two classes, and the higher the uncertainty is. For example, if the probabilities of the sample belonging to class A and class B respectively are (0.51, 0.49), then the interval between the probability of the sample belonging to the class A and the probability of the sample belonging to the class B is small, and it is easy to classify the sample into two classes. The classification model may include a plurality of classifiers, and the sample is submitted to the plurality of classifiers at the same time and is voted based on the classifiers. The more inconsistent the classifier voting result, the higher the uncertainty of the sample.

In operation S412, a score of each original sample is determined according to the uncertainty of the original sample.

In operation S413, an original sample having a score greater than a preset threshold is selected from the original sample set as the to-be-labeled sample.

According to the embodiments of the present disclosure, the uncertainty of the sample is calculated for each strategy, and the uncertainty of the sample may be scored. Exemplarily, the uncertainty may be divided into a plurality of intervals which are incremented, and each interval may correspond to a score. For example, the uncertainty may be divided into interval 1 to interval 5 corresponding to a score of 1 to a score of 5, respectively. The greater the uncertainty, the higher the score. When the uncertainty of the sample belongs to the interval 1, the score of the sample is 1, and when the uncertainty of the sample belongs to the interval 2, the score of the sample is 2, and so on. In this manner, each sample is scored. It should be noted that different intervals of uncertainty may be set for different strategies. After scoring for each strategy, a weighted processing may be performed on the score under each strategy, so as to obtain a final score. Then, a sample with a score greater than a value (for example, a score greater than 3) may be selected as the to-be-labeled sample.

According to the embodiments of the present disclosure, before the to-be-labeled sample is selected, as well as after the to-be-labeled sample is selected but before the to-be-labeled sample is transmitted to the second classification model for labeling, the samples may be further filtered based on a representativeness of the samples. For the representativeness of the samples, it is possible to reduce the number of samples in the sample set based on a similarity between the samples, that is, one or more of samples with a high similarity may be deleted, so that the selected sample has a representativeness. Exemplarily, a strategy of retaining one of a plurality of samples with a similarity greater than a threshold and deleting the other samples may be adopted. Further, the number of samples may be set, and a deletion may be performed from the sample with the highest similarity until the preset number is reached. For example, it may be set to retain 10,000 samples, and the deletion may be performed from the 15,000th sample until 10,000 samples are left. The reduction of samples may reduce the sample redundancy and improve the model iteration speed.

Figure 5:
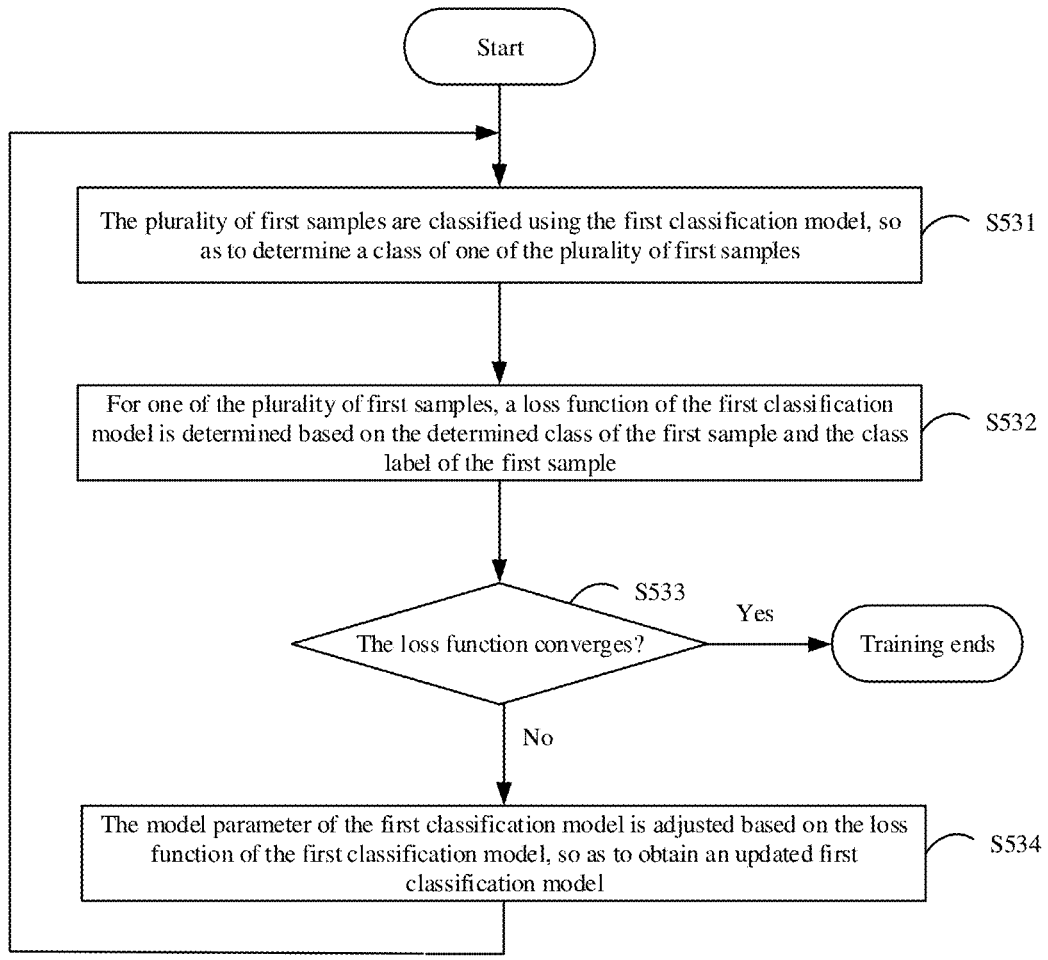
FIG. 5 shows a flowchart of a method of training the first classification model by using a first labeled sample set according to an embodiment of the present disclosure.

FIG. 5 shows a flowchart of a method of training the first classification model by using the first labeled sample set according to an embodiment of the present disclosure.

As shown in FIG. 5, the method may include operation S531 to operation S534.

In operation S531, the plurality of first samples are classified using the first classification model, so as to determine a class of one of the plurality of first samples.

In operation S532, for one of the plurality of first samples, a loss function of the first classification model is determined based on the determined class of the first sample and the class label of the first sample.

In operation S533, it is determined whether the loss function of the first classification model converges. If not, operation S534 is performed. If so, the training ends.

In operation S534, the model parameter of the first classification model is adjusted based on the loss function of the first classification model, so as to obtain an updated first classification model. The above training process may be repeatedly performed using the updated first classification model until the loss function of the first classification model converges.

According to the embodiments of the present application, a sample X in the first labeled sample set may be input into the first classification model, and the first classification model may output a class prediction result for the sample X. A loss function of the first classification model may be determined according to a difference between the class prediction result for the sample X output by the first classification model and the class label of the sample X labeled by the second classification model, and the model parameter of the first classification model may be adjusted according to the loss function, so as to obtain an updated first classification model. The above training process may be repeatedly performed using the updated first classification model until the loss function converges, so as to obtain the trained first classification model.

Figure 6:
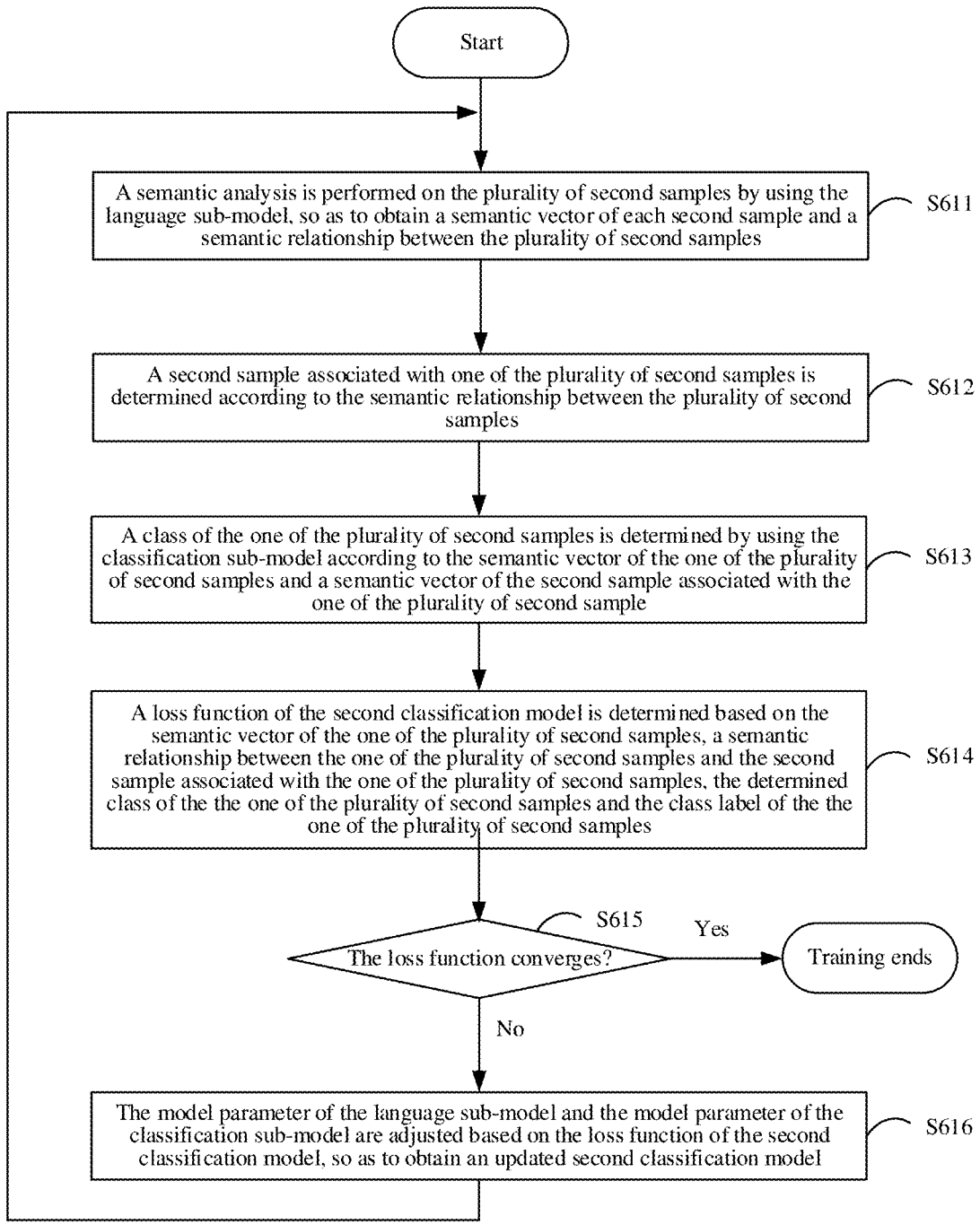
FIG. 6 shows a flowchart of a method of training a second classification model by using a second labeled sample set according to an embodiment of the present disclosure.

FIG. 6 shows a flowchart of a method of training the second classification model by using a second labeled sample set according to an embodiment of the present disclosure.

According to the embodiments of the present application, the second labeled sample set may be a set of manually labeled samples, and each sample in the second labeled sample set may contain class information which is manually labeled.

As shown in FIG. 6, the method may include operation S611 to operation S616.

In operation S611, a semantic analysis is performed on the plurality of second samples by using the language sub-model, so as to obtain a semantic vector of each second sample and a semantic relationship between the plurality of second samples.

According to the embodiments of the present disclosure, the second classification model includes a language sub-model and a classification sub-model. The sample in the second labeled sample set may be input to the language sub-model, and the language sub-model may output the semantic vector of each sample and a semantic order between each sample. For example, for sample 1 and sample 2, a semantic vector of the sample 1, a semantic vector of the sample 2, and whether a context of the sample 1 is sample 2 may be output using the language sub-model.

In operation S612, a second sample associated with one of the plurality of second samples is determined according to the semantic relationship between the plurality of second samples.

According to the embodiments of the present disclosure, the sample 1 is processed by the language sub-model and a vector expression of the sample 1 is output, the language sub-model further provides an output indicating that a sentence next to the sample 1 is the sample 2, then the vector expression of the sample 1 and a vector expression of the sample 2 are input to the classification sub-model for processing.

In operation S613, a class of the one of the plurality of second samples is determined by using the classification sub-model according to the semantic vector of the one of the plurality of second samples and a semantic vector of the second sample associated with the one of the plurality of second sample.

According to the embodiments of the present disclosure, for the sample 1 processed by the language sub-model, the sample 1 and the sample 2 associated with the sample 1 are input to the second classification model. A weight for the sample 1 may be greater than that for the sample 2. This is because that some sample may have unclear semantics, and the semantics of the sample may be determined according to the semantics of a context sample of the sample. The second classification model may output the class prediction result for the sample 1 based on the semantics of the sample 1 and the semantics of the sample 2.

In operation S614, for the one of the plurality of second samples, a loss function of the second classification model is determined based on the semantic vector of the one of the plurality of second samples, a semantic relationship between the one of the plurality of second samples and the second sample associated with the one of the plurality of second samples, the determined class of the the one of the plurality of second samples and the class label of the the one of the plurality of second samples.

According to the embodiments of the present disclosure, the loss function of the second classification model may include a loss of the language sub-model and a loss of the classification sub-model. The loss of the language sub-model may include a loss between the sample vector output by the language sub-model and a true sample vector, and further include a loss between a context relationship between the sample 1 and the sample 2 output by the language sub-model and a true relationship between the sample 1 and the sample 2. The loss of the classification sub-model may be determined according to a difference between the class prediction result for the sample 1 output by the second classification model and the class label of the sample 1 manually labeled. A sum of the loss of the language sub-model and the loss of the classification sub-model may be used as the loss of the second classification model.

In operation S615, it is determined whether the loss function of the second classification model converges. If not, operation S616 is performed. If so, the training ends.

In operation S616, the model parameter of the language sub-model and the model parameter of the classification sub-model are adjusted based on the loss function of the second classification model, so as to obtain an updated second classification model. The above training process may be repeatedly performed using the updated second classification model until the loss function of the second classification model converges, so as to obtain the trained second classification model.

According to the embodiments of the present disclosure, if the loss function of the second classification model does not converge, the model parameter of the second classification model may be adjusted according to the loss function so as to obtain the updated second classification model. The above training process may be repeatedly performed using the updated second classification model until the loss function converges, so as to obtain the trained second classification model.

Figure 7:
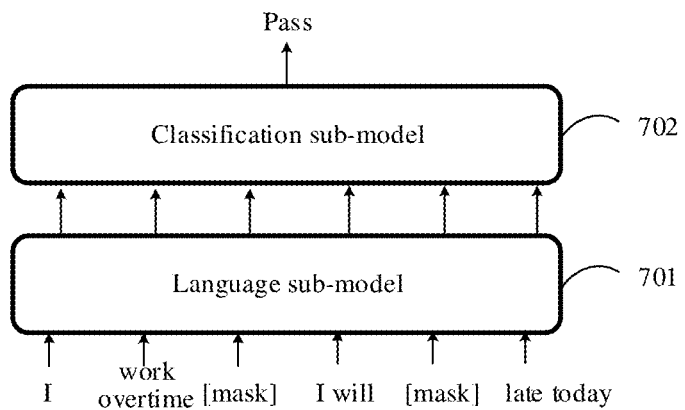
FIG. 7 shows a schematic diagram of a method of training the second classification model according to an embodiment of the present disclosure.

FIG. 7 shows a flowchart of a method of training the second classification model according to an embodiment of the present disclosure.

As shown in FIG. 7, the second classification model includes a language sub-model 701 and a classification sub-model 702. The language sub-model 701 may be an ERNIE (Enhanced Representation from kNowledge IntEgration) model. Alternatively, the language sub-model 701 may be a Bert_base model, a Bert_large model. or an ERNIE-tiny model. The ERNIE-tiny model is a pre-trained model by distillation based on the ERNIE model, having a shorter training time and a higher prediction speed. The ERNIE model is a model trained based on a large amount of unsupervised text corpus and contains a large amount of semantic knowledge, and the ERNIE model may learn language characteristics of the training corpus. After an introduction of the ERNIE model, a large number of unlabeled message texts may be input into the ERNIE language model, and an incremental training may be performed on the model by taking a masked language model and a next sentence prediction as training tasks, so as to obtain the language sub-model which is sensitive to instant message terms and specific to the field of instant message.

As shown in FIG. 7, the masked language model task refers to masking or replacing any character or word in a sentence, and then using the model to predict the masked or replaced part. For example, the word "today" in sentence 1 "I work overtime today" is masked, and then the sentence 1 is input into the model to let the model predict and restore the masked part. When calculating the loss, only a loss of the masked part may be calculated. The next sentence prediction is to input two sentences (such as sentence 1 and sentence 2) into the model with a representation of [sentence 1] step [sentence 2], let the model predict whether the next sentence to the sentence 1 is the sentence 2. The model may output yes or no, and the model loss may be calculated based on a true context relationship between the sentence 1 and the sentence 2. When the masked language model and the next sentence prediction are combined for the model training, [I work overtime mask] step [I will mask late today] may be input into the model, and a sum of the losses of the two tasks may be taken into account when calculating the loss. For example, the loss function may be determined with a target that the model outputs "today", "go home" and "yes", then the model parameter is adjusted, and the training is continuously performed, so that the trained language sub-model may output a semantic expression and a semantic relationship of the sentences.

As shown in FIG. 7, a classification sub-model 702 is added to an output end of the language sub-model ERNIE, that is, two layers of fully connected networks may be stitched as a classification network on the output end of the language sub-model. A small amount of manually labeled instant message checking data may be input into the network, and the language sub-model may be continuously iterated by combining the loss function of the language sub-model and the loss function of the classification sub-model, so as to obtain an instant message checking model fine-tuned based on the language model. The classification sub-model 702 may output the class of the instant message as being approved or being unapproved.

Figure 8:
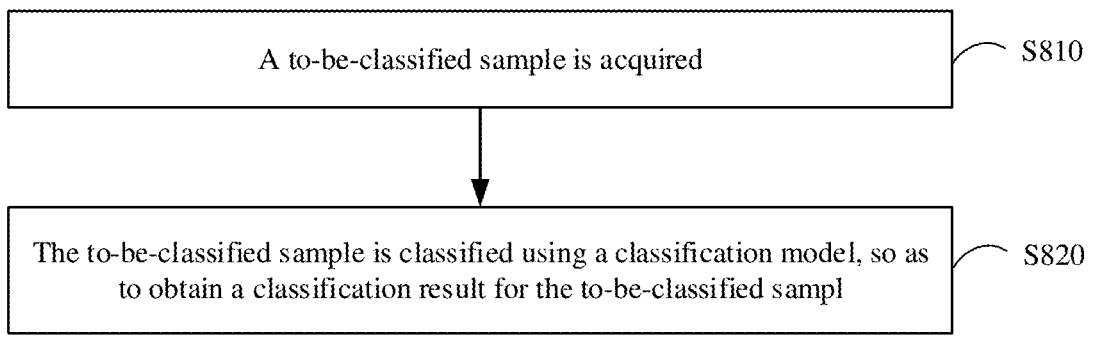
FIG. 8 shows a flowchart of a method of classifying a sample according to an embodiment of the present disclosure.

FIG. 8 shows a flowchart of a method of classifying a sample according to an embodiment of the present disclosure.

As shown in FIG. 8, a method 800 of classifying a sample may include operation S810 to operation S820.

In operation S810, a to-be-classified sample is acquired.

In operation S820, the to-be-classified sample is classified using a classification model, so as to obtain a classification result for the to-be-classified sample.

According to the embodiments of the present disclosure, the method of training the classification model described above may be used for training so as to obtain a trained classification model. When the to-be-classified sample is input to the trained classification model, the class of the sample may be output. Exemplarily, the sample may be an instant message text, and when the instant message text is input into the classification model, the classification model may output a label indicating that the instant message is approved or a label indicating that the instant message is unapproved, so that the instant message may be quickly checked and the labor costs may be saved.

Figure 9:
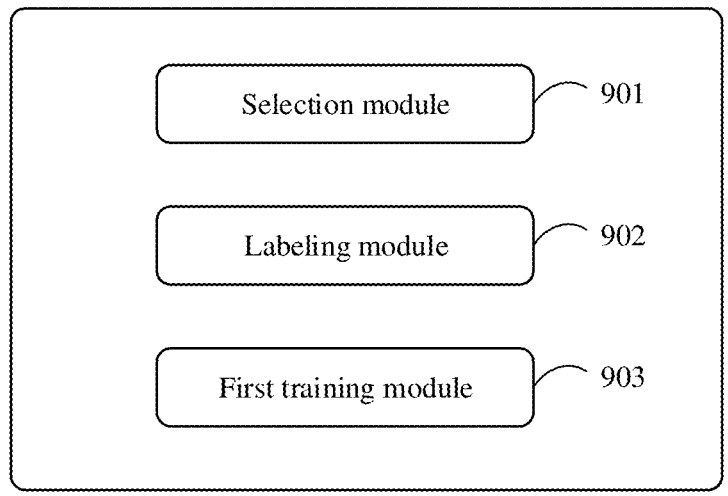
FIG. 9 shows a block diagram of an apparatus of training a classification model according to an embodiment of the present disclosure.

FIG. 9 shows a block diagram of an apparatus of training a classification model according to an embodiment of the present disclosure.

As shown in FIG. 9, an apparatus 900 of training a classification model may include a selection module 901, a labeling module 902 and a first training module 903.

The selection module 901 is used to select, from an original sample set, a plurality of original samples having a class prediction result meeting a preset condition as a to-be-labeled samples according to a class prediction result for a plurality of original samples in the original sample set. The class prediction result for the plurality of original samples is generated in a process of classifying the plurality of original samples in the original sample set using the first classification model.

The labeling module 902 is used to label the to-be-labeled sample as belonging to a class by using the second classification model, so as to obtain a first labeled sample set.

The training module 903 is used to train the first classification model by using the first labeled sample set.

According to the embodiments of the present disclosure, the apparatus 900 of training the classification model may further include a calculation module and a classification module.

The calculation module is used to calculate, by using the first classification model, a probability of each original sample in the original sample set belonging to each class of a plurality of preset classes, as a class prediction result for the each original sample.

The classification module is used to determine a class of each original sample in the original sample set and label the each original sample as belonging to the determined class according to the probability of the each original sample belonging to each class.

According to the embodiments of the present disclosure, the selection module 901 may include a calculation unit, a scoring unit, and a selection unit.

The calculation unit is used to calculate an uncertainty of each original sample based on the probability of the each original sample belonging to each of the plurality of classes.

The scoring unit is used to determine a score of each original sample according to the uncertainty of the original sample.

The selection unit is used to select an original sample having a score greater than a preset threshold from the original sample set as the to-be-labeled sample.

According to the embodiments of the present disclosure, the calculation unit may be specifically used to calculate at least one of a maximum information entropy of each original sample, a minimum confidence of the each original sample, a minimum interval between probabilities of the each original sample belonging to different classes, or a classifier voting result for the each original sample, based on the probability of the each original sample belonging to each of the plurality of classes.

According to the embodiments of the present disclosure, the first labeled sample set may include a plurality of first samples with a class label, and the first training module may include a first prediction unit, a first determination unit, a first judgment unit, and a first adjustment unit.

The first prediction unit is used to classify the plurality of first samples using the first classification model, so as to determine a class of one of the plurality of first samples.

The first determination unit is used to determine, for one of the plurality of first samples, a loss function of the first classification model based on the determined class of the first sample and the class label of the first sample.

The first judgment unit is used to determine whether the loss function of the first classification model converges.

The first adjustment unit is used to adjust the model parameter of the first classification model in a case that the first judgment unit determines that the loss function does not converge, so as to obtain an updated first classification model.

According to the embodiments of the present disclosure, the apparatus 900 of training the classification model may further include a second training module.

The second training module is used to train the second classification model by using the second labeled sample set.

According to the embodiments of the present disclosure, the second labeled sample set may include a plurality of second samples with a class label, and the second classification model includes a language sub-model and a classification sub-model. The second training module may include a first processing unit, a second determination unit, a second prediction unit, a third determination unit, a second judgment unit, and a second adjustment unit.

The first processing unit is used to perform a semantic analysis on the plurality of second samples by using the language sub-model, so as to obtain a semantic vector of each second sample and a semantic relationship between the plurality of second samples.

The second determination unit is used to determine a second sample associated with one of the plurality of second samples according to the semantic relationship between the plurality of second samples.

The second prediction unit is used to determine a class of the one of the plurality of second samples by using the classification sub-model according to the semantic vector of the one of the plurality of second samples and the semantic vector of the second sample associated with the one of the plurality of second samples.

The third determination unit is used to determine, for the one of the plurality of second samples, a loss function of the second classification model based on the semantic vector of the one of the plurality of second samples, a semantic relationship between the one of the plurality of second samples and the second sample associated the one of the plurality of second samples, the determined class of the one of the plurality of second samples and the class label of the one of the plurality of second samples.

The second judgment unit is used to determine whether the loss function of the second classification model converges.

The second adjustment unit is used to adjust the model parameter of the second classification model based on the loss function of the second classification model in a case that the second judgment unit determines that the loss function of the second classification model does not converge, so as to obtain an updated second classification model.

According to the embodiments of the present disclosure, the second training module may be used to train the first classification model by using the first labeled sample set and the second labeled sample set.

According to the embodiments of the present disclosure, the apparatus 900 of training the classification model may further include a processing module.

The processing module may be used to determine a similarity between the to-be-labeled samples and delete one or more of the to-be-labeled samples based on the similarity between the to-be-labeled samples, before the labeling module 902 labels the to-be-labeled sample as belonging to a class.

Figure 10:
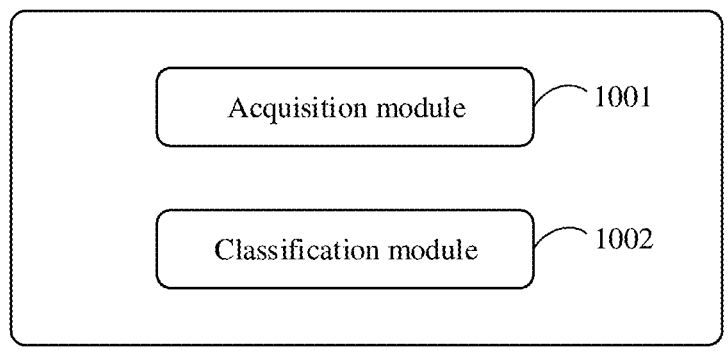
FIG. 10 shows a block diagram of an apparatus of classifying a sample according to an embodiment of the present disclosure.

FIG. 10 shows a block diagram of an apparatus of classifying a sample according to an embodiment of the present disclosure.

As shown in FIG. 10, an apparatus 1000 of classifying a sample may include an acquisition module 1001 and a classification module 1002.

The acquisition module 1001 may be used to acquire a to-be-classified sample.

The classification module 1002 may be used to classify the to-be-classified sample by using a classification model, so as to obtain a classification result for the to-be-classified sample.

In the technical solution of the present disclosure, collecting, storing, using, processing, transmitting, providing, and disclosing etc. of user personal information involved comply with provisions of relevant laws and regulations, and do not violate public order and good custom.

According to the embodiments of the present disclosure, the present disclosure further provides an electronic device and a readable storage medium.

Figure 11:
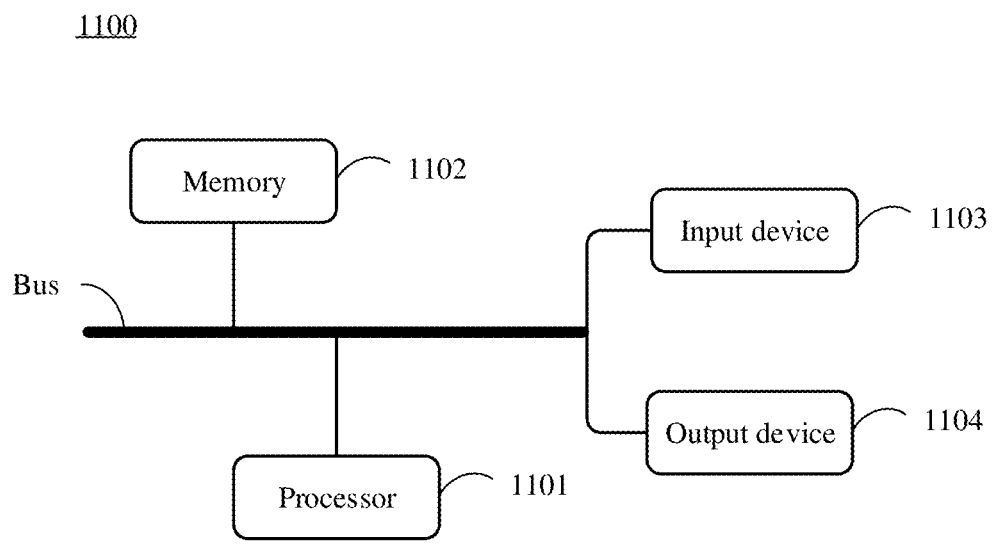
FIG. 11 shows a block diagram of an electronic device for implementing the method of training the classification model and/or the method of classifying the sample according to an embodiment of the present disclosure.

FIG. 11 shows a block diagram of an electronic device for implementing the method of training the classification model according to an embodiment of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 11, an electronic device 1100 may include one or more processors 1101, a memory 1102, and interfaces for connecting various components, including a high-speed interface and a low-speed interface. The various components are connected to each other by using different buses, and may be installed on a common motherboard or installed in other manners as required. The processor may process instructions executed in the electronic device, including instructions stored in or on the memory to display graphical information of GUI (Graphical User Interface) on an external input/output device (such as a display device coupled to an interface). In other embodiments, a plurality of processors and/or a plurality of buses may be used with a plurality of memories, if necessary. Similarly, a plurality of electronic devices may be connected in such a manner that each device provides a part of necessary operations (for example, as a server array, a group of blade servers, or a multi-processor system). In FIG. 11, a processor 1101 is illustrated by way of example.

The memory 1102 is a non-transitory computer-readable storage medium provided by the present disclosure. The memory stores instructions executable by at least one processor, to cause the at least one processor to perform the method of training the classification model provided in the present disclosure. The non-transitory computer-readable storage medium of the present disclosure stores computer instructions for allowing a computer to execute the method of training the classification model provided in the present disclosure.

The memory 1102, as a non-transitory computer-readable storage medium, may be used to store non-transitory software programs, non-transitory computer-executable programs and modules, such as program instructions/modules corresponding to the method of training the classification model in the embodiments of the present disclosure (for example, the selection module 901, the labeling module 902 and the first training module 903 shown in FIG. 9). The processor 1101 may execute various functional applications and data processing of the server by executing the non-transient software programs, instructions and modules stored in the memory 1102, thereby implementing the method of training the classification model in the embodiments of the method mentioned above.

The memory 1102 may include a program storage area and a data storage area. The program storage area may store an operating system and an application program required by at least one function. The data storage area may store data etc. generated by using the electronic device. In addition, the memory 1102 may include a high-speed random access memory, and may further include a non-transitory memory, such as at least one magnetic disk storage device, a flash memory device, or other non-transitory solid-state storage devices. In some embodiments, the memory 1102 may optionally include a memory provided remotely with respect to the processor 1101, and such remote memory may be connected through a network to the electronic device 1100 for implementing the method of training the classification model. Examples of the above-mentioned network include, but are not limited to the Internet, intranet, local area network, mobile communication network, and combination thereof.

The electronic device 1100 for implementing the method of training the classification model may further include an input device 1103 and an output device 1104. The processor 1101, the memory 1102, the input device 1103 and the output device 1104 may be connected by a bus or in other manners. In FIG. 11, the connection by a bus is illustrated by way of example.

The input device 1103 may receive input information of numbers or character, and generate key input signals related to user settings and function control of the electronic device for implementing the method of training the classification model, such as a touch screen, a keypad, a mouse, a track pad, a touchpad, a pointing stick, one or more mouse buttons, a trackball, a joystick, and so on. The output device 1104 may include a display device, an auxiliary lighting device (for example, LED), a tactile feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in a digital electronic circuit system, an integrated circuit system, an application specific integrated circuit (ASIC), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

These computing programs (also referred as programs, software, software applications, or codes) include machine instructions for a programmable processor, and may be implemented using high-level programming languages, object-oriented programming languages, and/or assembly/ machine languages. As used herein, the terms "machine-readable medium" and "computer-readable medium" refer to any computer program product, apparatus and/or device (for example, magnetic disk, optical disk, memory, programmable logic device (PLD)) for providing machine instructions and/or data to a programmable processor, including a machine-readable medium for receiving machine instructions as machine-readable signals. The term "machine-readable signal" refers to any signal for providing machine instructions and/or data to a programmable processor.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server in combination with a blockchain.

According to the technical solution of the embodiments of the present disclosure, a plurality of samples with a class prediction result meeting a preset condition may be selected from a sample set as a to-be-labeled sample according to class prediction results for each sample of a plurality of samples in the sample set generated in a process of classifying the plurality of samples in the sample set using the first classification model, and the to-be-labeled sample may be labeled as belonging to a class by using the second classification model, so as to obtain the first labeled sample set. The first classification model may be trained using the first labeled sample set. Because the first classification model is trained using the labeled sample obtained by the second classification model, the manually labeled data may be reduced, and the labeling cost may be reduced. Further, because the first classification model is trained using the sample set labeled by the second classification model, the prediction ability of the first classification model may be close to that of the second classification model, and the classification accuracy of the first classification model may be improved. Furthermore, because the sample with a large amount of information is actively selected to be labeled by the second classification model in the iteration process of the first classification model, a high classification accuracy may be achieved in a case of a small training set.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of training a classification model, the classification model comprising a first classification model and a second classification model, the method comprising:

selecting, from an original sample set, a plurality of original samples having a class prediction result meeting a preset condition as to-be-labeled samples, according to a class prediction result for a plurality of original samples in the original sample set, wherein the class prediction result for the plurality of original samples is generated in a process of classifying the plurality of original samples in the original sample set using the first classification model;

labeling the to-be-labeled sample as belonging to a class by using the second classification model, so as to obtain a first labeled sample set;

training the first classification model by using the first labeled sample set; and training the second classification model by using a second labeled sample set, wherein the second labeled sample set comprises a plurality of second samples with a class label, and the second classification model comprises a language sub-model and a classification sub-model; and the training the second classification model by using the second labeled sample set comprises:

performing a semantic analysis on the plurality of second samples by using the language sub-model, so as to obtain a semantic vector of each second sample and a semantic relationship between the plurality of second samples;

determining a second sample associated with one of the plurality of second samples according to the semantic relationship between the plurality of second samples;

determining, by using the classification sub-model, a class of the one of the plurality of second samples according to the semantic vector of the one of the plurality of second samples and a semantic vector of the second sample associated with the one of the plurality of second samples;

for the one of the plurality of second samples, determining a loss function of the second classification model based on the semantic vector of the one of the plurality of second samples, a semantic relationship between the one of the plurality of second samples and the second sample associated with the one of the plurality of second samples, the determined class of the one of the plurality of second samples and the class label of the one of the plurality of second samples, and adjusting a model parameter of the second classification model based on the loss function of the second classification model, so as to obtain an updated second classification model; and for a next second sample, returning to the step of performing the semantic analysis on the plurality of second samples by using the updated second classification model, until the loss function of the second classification model converges, so as to obtain a trained second classification model.

2. The method of claim 1, wherein the classifying the plurality of original samples in the original sample set using the first classification model comprises:

calculating, by using the first classification model, a probability of each original sample in the original sample set belonging to each class of a plurality of preset classes, as a class prediction result for the each original sample; and determining a class of each original sample in the original sample set and labeling the each original sample as belonging to the determined class, according to the probability of the each original sample belonging to each class.

3. The method of claim 2, wherein the selecting, from an original sample set, a plurality of original samples having a class prediction result meeting a preset condition as to-be-labeled samples comprises:

calculating an uncertainty of each original sample based on the probability of the each original sample belonging to each of the plurality of classes;

determining a score of each original sample according to the uncertainty of the each original sample; and selecting an original sample having a score greater than a preset threshold from the original sample set as the to-be-labeled sample.

4. The method of claim 2, wherein the original sample is a text.

5. The method of claim 3, wherein the calculating an uncertainty of each original sample based on the probability of the each original sample belonging to each class of the plurality of classes comprises:

calculating at least one of a maximum information entropy of each original sample, a minimum confidence of the each original sample, a minimum interval between probabilities of the each original sample belonging to different classes, or a classifier voting result for the each original sample, based on the probability of the each original sample belonging to each of the plurality of classes.

6. The method of claim 1, wherein the first labeled sample set comprises a plurality of first samples with a class label, and the training the first classification model by using the first labeled sample set comprises:

classifying the plurality of first samples by using the first classification model, so as to determine a class of one of the plurality of first samples;

for one of the plurality of first samples, determining a loss function of the first classification model based on the determined class of the first sample and the class label of the first sample, and adjusting a model parameter of the first classification model based on the loss function of the first classification model, so as to obtain an updated first classification model; and for a next first sample, returning to the step of classifying the plurality of samples by using the updated first classification model, until the loss function of the first classification model converges, so as to obtain a trained first classification model.

7. The method of claim 1, wherein the training the first classification model by using the first labeled sample set comprises:

training the first classification model by using the first labeled sample set and the second labeled sample set.

8. The method of claim 1, further comprising: before labeling the to-be-labeled sample as belonging to a class by using the second classification model, determining a similarity between the to-be-labeled samples; and deleting one or more of the to-be-labeled samples based on the similarity between the to-be-labeled samples.

9. The method of claim 1, wherein the original sample is a text.

10. A method of classifying a sample, comprising:

acquiring a to-be-classified sample; and classifying the to-be-classified sample by using a classification model, so as to obtain a classification result for the to-be-classified sample, wherein the classification model is trained by using the method of claim 1.

11. An electronic device, comprising:

at least one processor; and a memory communicatively connected to the at least one processor, wherein the memory stores instructions executable by the at least one processor, and the instructions, when executed by the at least one processor, cause the at least one processor to implement the method of claim 1.

12. The electronic device of claim 11, wherein the at least one processor is further configured to:

calculate, by using the first classification model, a probability of each original sample in the original sample set belonging to each class of a plurality of preset classes, as a class prediction result for the each original sample; and determine a class of each original sample in the original sample set and label the each original sample as belonging to the determined class, according to the probability of the each original sample belonging to each class.

13. The electronic device of claim 12, wherein the at least one processor is further configured to:

calculate an uncertainty of each original sample based on the probability of the each original sample belonging to each of the plurality of classes;

determine a score of each original sample according to the uncertainty of the each original sample; and select an original sample having a score greater than a preset threshold from the original sample set as the to-be-labeled sample.

14. A non-transitory computer-readable storage medium having computer instructions stored thereon, wherein the computer instructions are configured to cause a computer to implement the method of claim 1.

15. The non-transitory computer-readable storage medium of claim 14, wherein the computer instructions are further configured to cause a computer to:

calculate, by using the first classification model, a probability of each original sample in the original sample set belonging to each class of a plurality of preset classes, as a class prediction result for the each original sample; and determine a class of each original sample in the original sample set and label the each original sample as belonging to the determined class, according to the probability of the each original sample belonging to each class.

16. The non-transitory computer-readable storage medium of claim 15, wherein the computer instructions are further configured to cause a computer to:

calculate an uncertainty of each original sample based on the probability of the each original sample belonging to each of the plurality of classes;

determine a score of each original sample according to the uncertainty of the each original sample; and select an original sample having a score greater than a preset threshold from the original sample set as the to-be-labeled sample.

17. An electronic device, comprising:

at least one processor; and a memory communicatively connected to the at least one processor, wherein the memory stores instructions executable by the at least one processor, and the instructions, when executed by the at least one processor, cause the at least one processor to implement the method of claim 10.

18. A non-transitory computer-readable storage medium having computer instructions stored thereon, wherein the computer instructions are configured to cause a computer to implement the method of claim 10.

* * * * *